United States Patent
Li et al.

(10) Patent No.: US 7,599,090 B2
(45) Date of Patent: Oct. 6, 2009

(54) METHOD AND APPARATUS FOR AUTOMATICALLY SEGMENTING A MICROARRAY IMAGE

(75) Inventors: Xingyuan Li, Quincy, MA (US); Jay S. Gehrig, Westford, MA (US)

(73) Assignee: PerkinElmer Health Sciences, Inc., Waltham, MA (US)

(*) Notice: Subject to any disclaimer, the term of this patent is extended or adjusted under 35 U.S.C. 154(b) by 822 days.

(21) Appl. No.: 11/120,055

(22) Filed: May 2, 2005

(65) Prior Publication Data
US 2005/0244040 A1 Nov. 3, 2005

Related U.S. Application Data

(60) Provisional application No. 60/521,475, filed on May 3, 2004.

(51) Int. Cl.
*G06K 15/10* (2006.01)
*G06K 9/34* (2006.01)
*G06K 9/00* (2006.01)

(52) U.S. Cl. .................. 358/1.8; 382/129; 382/171; 382/174; 382/133

(58) Field of Classification Search .............. 382/129, 382/289–296, 100, 173, 128, 174, 133; 385/1.8
See application file for complete search history.

(56) References Cited

U.S. PATENT DOCUMENTS

| | | | |
|---|---|---|---|
| 6,349,144 B1 | 2/2002 | Shams | |
| 6,768,820 B1* | 7/2004 | Yakhini et al. | 382/289 |
| 6,980,677 B2 | 12/2005 | Niles et al. | |
| 7,136,517 B2* | 11/2006 | Ugolin et al. | 382/129 |
| 2003/0219150 A1* | 11/2003 | Niles et al. | 382/128 |
| 2004/0243341 A1* | 12/2004 | Le Cocq | 702/150 |

OTHER PUBLICATIONS

R. Hirata et al. Segmentation of Microarray Images by Mathematical Morphology. Real-Time Imaging 8, 491-505 (2002). Elsevier Science.*

* cited by examiner

*Primary Examiner*—Kieu-Oanh Bui
*Assistant Examiner*—Oleg Roytburd
(74) *Attorney, Agent, or Firm*—Cesari and McKenna, LLP; Patricia A. Sheehan

(57) ABSTRACT

A microarray image is segmented into discreet segments for respective spots in the microarray image based on locating microarray image rows and columns by maximizing scores associated with vertical and horizontal image projections. To determine the locations of the rows and columns that extend through artifacts that involve multiple spots and/or multiple columns and rows, the scores may also include contributions from the gaps between adjacent rows and columns. The scores are calculated by stepping windows containing nominally spaced spot-sized row or column boundaries, over the horizontal projection curves. At each step a total row or column score is calculated that represents the areas of the projection curves that fall within the row boundaries. The system then selects the window positions that correspond to the maximum total row score and total column score, and uses the locations of the boundaries as the locations of row and column "stripes" that are sized to the spot diameters. The intersections of the row and column stripes define the segments for the respective spots, and the centers of the intersections are the locations for the spot location, or grid, markers. The system may also determine the best spot size, column and row gap sizes and sub-array gap sizes by changing the boundaries accordingly and determining corresponding maximum scores.

25 Claims, 13 Drawing Sheets

METHOD AND APPARATUS FOR AUTOMATICALLY SEGMENTING A MICROARRAY IMAGE

CROSS-REFERENCE TO RELATED APPLICATION

The present application claims the benefit of U.S. Provisional Application Ser. No. 60/521,475, filed on May 3, 2004, which is hereby incorporated by reference herein.

BACKGROUND OF THE INVENTION

This invention relates to microarrays. It relates more particularly to a method and apparatus for locating spots in a microarray image, also referred to as image segmentation.

A microarray is an array of very small samples of chemical or biochemical material drawn from reservoirs by a spotting instrument or spotter and deposited as a grid of many such spots on a solid substrate such as a glass microscope slide. When the microarray is exposed to selected probe material including a label molecule such as a fluorophore, the probe material selectively binds to the target sites only where complimentary binding spots are present through a process called hybridization thereby providing an assay. The microarray may then be scanned by a florescence-detecting scanning instrument or scanner to produce a pixel map of fluorescent intensities. To obtain statistically derived numerical data from the usually non-uniform and noisy fluorescent images of the spots, the scanning is done at high resolution so that each spot is represented by many pixels, e.g. up to 100 per spot. This fluorescent intensity map may be analyzed using special purpose quantitation algorithms which reveal the relative concentrations of the fluorescent probes and hence the level of gene expression, protein concentration, etc. present in the assayed probe samples. This quantization step is usually performed on an image analysis computer or workstation and results in a set of numerical data which includes at least a numerical value of the representative probe signal for each microarray spot in the image.

The most common type of spotting instrument is the pin spotter which includes a plurality of printing pins arranged in a pattern on a robot-actuated print head. A typical print head may contain, say, sixteen pins arranged in a rectangular grid. The location tolerances between the print head and the printing tips of the individual pins is typically many tens of microns, which is larger than the typical robot's print head positioning tolerance of one to three microns. It is because of this and the necessity of avoiding the printing of merged or touching spots on the substrate that microarrays are usually printed as a pattern of sub-arrays or blocks, with one block being printed by each pin. The motion of the spotter's print head is such that each pin prints with a typical spot center-to-center distance within each block of 80 to 150 microns, whereas the spacing between adjacent blocks is typically 1.5 to 10 times larger than that.

This method is also applicable for use with multi-tip, non-contact piezo or ink-jet spotters. Instead of using pins, these instruments use one or more jets to form the spots on the microarray substrate.

The present invention concerns specifically the process of image segmentation or spot location in preparation for microarray quantitation. This is because the quantitation algorithm needs to know which pixels in the vicinity of each microarray spot are to be used to calculate that spot's intensity signal and which pixels, referred to as background pixels, should be excluded from that spot.

To start the spot location or segmentation process, the microarray image is usually displayed on an image analysis computer or workstation monitor. Then, an image of a grid of microarray spot location markers which usually reflect the diameter of the spots is superimposed on the image. This grid may be generated by the spotter and delivered to the work station via a file, e.g. the standard .gal file promulgated by Axon Instruments Co., via a disk, bus or other data transfer means. Alternatively, the nominal grid information, e.g. number of rows and columns in the grid, the grid pattern, nominal spot spacing, etc. may be entered manually by a user via the workstation's keyboard.

A typical grid image may be a pattern of circles constituting the spot location markers with or without grid lines connecting the circles. Alternatively, crosses, polygons or other shapes can represent the markers in the grid image. The grid image is generally moveable on the microarray image by dragging and dropping it using a computer mouse, track ball or other computer pointing device. In some software implementations, individual spot location markers, or marker columns and rows can be repositioned with respect to the microarray image and the rest of the grid by dragging and dropping same.

In practice, a nominal grid rarely aligns well with the underlying scanned microarray image due to the combined effects of various tolerances in the spotting instrument. These include variations in the locations of the pin tips in the spotter's print head, misalignment of the print head with the spotter's x/y motion axes, non-orthogonality of the spotter's motion axes, spotter robot motion accuracy errors, and microarray substrate location errors in the spotter. There also may be scanning mechanism location accuracy errors in the scanner which scans the microarray image during the segmentation process.

Some of these errors are systematic in that they are repeatable for every microarray printed by a particular spotter, some errors are repeatable within a batch of printed arrays and some errors are random. For example, the shape of the outline of each microarray block is determined by the spotter robot's motion, the block size, the interspot distances and whether the block is rectangular or not. Since each block is printed simultaneously with all of the other blocks in the microarray, but with a different pin in the same print head, any deviations from the rectangular geometry within any block are usually identical in all of the other blocks. On the other hand, the location of the overall spot pattern in the image can vary from one array to another due to variations in the positions of the microarray substrates in the spotting instrument. A random spot location error may be caused by random variations in the motion of the print head in a given spotter which may cause small variations in the locations of individual spots within each block of the microarray.

Therefore, it is essential to reconcile the nominal location of each spot location marker in the nominal grid with the actual spot location in the underlying image. This has been done heretofore wholly manually, e.g. using a computer mouse, by moving or rotating a nominal grid of each block in the microarray or the whole array using visual feedback to align the spot location markers in the grid with the spots in the microarray image as displayed on the workstation monitor. For grid/array errors involving more than simple translations and/or rotations of the grid, a user may adjust the positions of individual spot location markers by dragging those markers and/or entire rows or columns of markers. This process is usually effective because the human eye is very sensitive to misalignment of similarly sized objects. However, manual manipulation of individual markers or rows or columns of such markers within the grid association with a given microarray to locate the spots is a tedious and time consuming task, bearing in mind that a is typical microarray may contain thousands of spots.

There do exist various algorithms which perform such spot location automatically, see e.g. U.S. Pat. Nos. 6,349,144 and 6,345,115. Such automating of the spot location process eliminates the painstaking labor involved in the manual methods described above, but the algorithms that are available to do so can produce erroneous results, especially for dim or noisy microarray images, See Marzolf et al., Validation of Microarray Image Analysis Accuracy, Bio Techniques 36:304-308, February 2004. Such automatic spot location techniques are also more likely to fail with increased location errors between the nominal grid markers and the actual spot locations in the microarray image.

In any event, spot location errors, if not corrected before quantitation, can lead to mis-identified spots (analytes) in the analysis of the array or incorrect quantitation results for some spots. Because of these frequent spot location errors with automatic spot location apparatus, manual inspection and correction of the automatic spot location results must often be performed thereby undoing some of the labor saving steps intended through the use of such automatic spot location methods. Even if the automatic methods produce good results, the automatic methods are generally computationally intensive, and thus, time consuming.

Certain automated methods use microarray image projections as discussed in Stanley et al. Microarray Image Spot Segmentation Using the Method of Projections, Biomed.Sci-.Instrum. 38:387-392, 2002 and United States patent application Publication U.S. 2004/0001623 to Ugolin et al. Stanley, for example, uses the maximum of each projection to locate a row or column of an array. While this method is not particularly computationally intensive, the method fails when multi-spot artifacts that span multiple rows or columns are encountered. Ugolin describes a more robust method that imposes a Fourier transform on the projections. The Ugolin method is, however, very computationally intensive, and thus slow.

Therefore, what is needed is an automated method and apparatus for locating spots in a microarray image which provides the accuracy and reliability of the manual spot location technique described above thereby avoiding spot location errors, is while doing away with the tedious and time consuming task of manually aligning the nominal grid or individual spot location markers or rows and columns of same on each microarray image, and while also avoiding the long computation times of transform based systems.

SUMMARY OF THE INVENTION

Accordingly the present invention aims to provide an improved apparatus for automatically locating spots in a microarray image.

Another object of the invention is to provide such apparatus which allows rapid and simple spot location using initial conditions for row and column boundaries that are defined by a nominal image segmentation grid.

A further object of the invention is to provide a spot location apparatus of this type which is user friendly and may be implemented in most microarray analysis workstations.

Other objects will, in part, be obvious and will, in part, appear hereinafter.

The invention accordingly comprises the several steps and the relation of one or more of such steps with respect to each of the others, and the apparatus embodying the features of construction, combination of elements and arrangement of parts which are adapted to effect such steps, all as exemplified in the following detailed description, and the scope of the invention will be indicated in the claims.

Basically, in accordance with the present method, a microarray image is segmented into discreet segments for respective spots in the microarray image based on locating microarray image rows and columns by maximizing scores associated with vertical and horizontal image projections. The scores also include contributions from the gaps between adjacent rows and columns, and can thus determine the respective locations of the rows and columns that extend through artifacts that involve multiple spots and/or multiple columns and rows.

The image projections are calculated as accumulations of contributions from pixels in horizontal, or row, and vertical, or column, directions. To determine the locations of, for example, the respective microarray image rows, for example, the system steps a window containing nominally spaced spot-sized row boundaries over the horizontal projection curves. At each step a total row score is calculated that represents the areas of the projection curves that fall within the row boundaries. The system then selects the window position that corresponds to the maximum total row score, and uses the locations of the boundaries as the locations of row "stripes" that are sized to the spot diameters.

The total row score for a given window position may be determined as the sum of individual row scores, each of which is a ratio of an average projection curve value associated with the location of the associated row boundary and a sum of average projection curve values associated with adjacent, i.e., upper and lower, gaps. The locations of the respective columns are similarly determined by stepping a window with nominally spaced column boundaries over the vertical projections, to determine a maximum total column score. The window position that corresponds to the maximum total column score then sets the locations of spot-sized column stripes. The intersections of the row and column stripes define the segments for the respective spots, and the centers of the intersections are the locations for the spot location, or grid, markers.

The method may calculate the row and column locations using a nominal spot size and nominal row and column spacing supplied by a user or through a .gif file that is associated with the image. Alternatively, as discussed in more detail below, the method may utilize a range of spot sizes and/or a range of row and column spacing values, to accommodate more precise segmentation requirements, uneven row and column spacing, and so forth.

When the grid corresponds to a sub-array, the method may further include a determination of the location sub-array gaps, to ensure that the calculations are not off by one or more rows or columns. To do this, the system includes contributions from peripheral, or "dummy," columns and/or rows in the calculations. The dummy columns, for example, are located to the left and right of the columns in the sub-array image that correspond to the nominal grid image, and are spaced therefrom by nominally-sized column gaps. If the grid image is nominally aligned with the sub-array image, the projection curve values associated with the dummy columns are relatively low because the dummy columns and associated dummy gaps correspond to the relatively large gaps between adjacent sub-arrays. Otherwise, the column projection values are relatively high, since the dummy columns align with spot locations.

To determine if the grid image aligns with the sub-array image in, for example, the horizontal direction, the method produces the total column score at each step of the window by calculating dummy column scores and subtracting a weighted version of the dummy scores from the sum of the column scores for the columns that correspond to the grid. If the grid image is aligned with the sub-array image, subtracting the dummy column scores does not reduce the sum significantly. Otherwise, subtracting the dummy scores reduces the sum, and thus, the total score by a relatively large amount. The system then selects the window position that corresponds to the maximum total column score, and by doing so correctly selects the window position in which the locations of the dummy columns correspond to the locations of the sub-array gaps, that is, the position in which the grid and sub-array images are correctly aligned. The selected window position also sets the locations of the grid columns with respect to the columns in the underlying sub-array image. The same method steps are repeated to determine the locations of the upper and lower sub-array image gaps and the grid rows.

As also discussed in more detail below, the system may rotate the nominal grid image relative to the pixel matrix of the sub-array image, to search through a rotated position. In this way, the system determines if the underlying sub-array image is rotated due to, for example, a misalignment of the microarray substrate in the microarray spotter or scanner. The system calculates total row and total column scores in the manner discussed above for each rotation position, and selects the rotation position that corresponds to the highest total row and total column scores. The system thus readily determines the locations and rotational position, or orientation, of the grid image rows and columns, such that the system can accurately segment tilted sub-array images.

In contrast to known prior method and systems for segmenting microarray images, the current method and system segments the microarray image quickly by using iterative calculations that are not particularly computationally intensive while at the same time producing results that are accurate even with multi-spot, multi-column artifacts. Further, the current method and system perform in this manner even if corner spots in the sub-array are dim or missing. The iterative calculations are performed on relatively small amounts of data, namely, the image row, column and gap projections, and thus, changes in position between iterations can be small, without slowing down the process. In this way, locations that vary by fractions of a spot diameter or are tilted slightly can be rapidly searched.

BRIEF DESCRIPTION OF THE DRAWINGS

For a fuller understanding of the nature and objects of the invention, reference should be made to the following detailed description taken in connection with the accompanying drawings, in which.

DETAILED DESCRIPTION OF AN ILLUSTRATIVE EMBODIMENT

Figure 1:
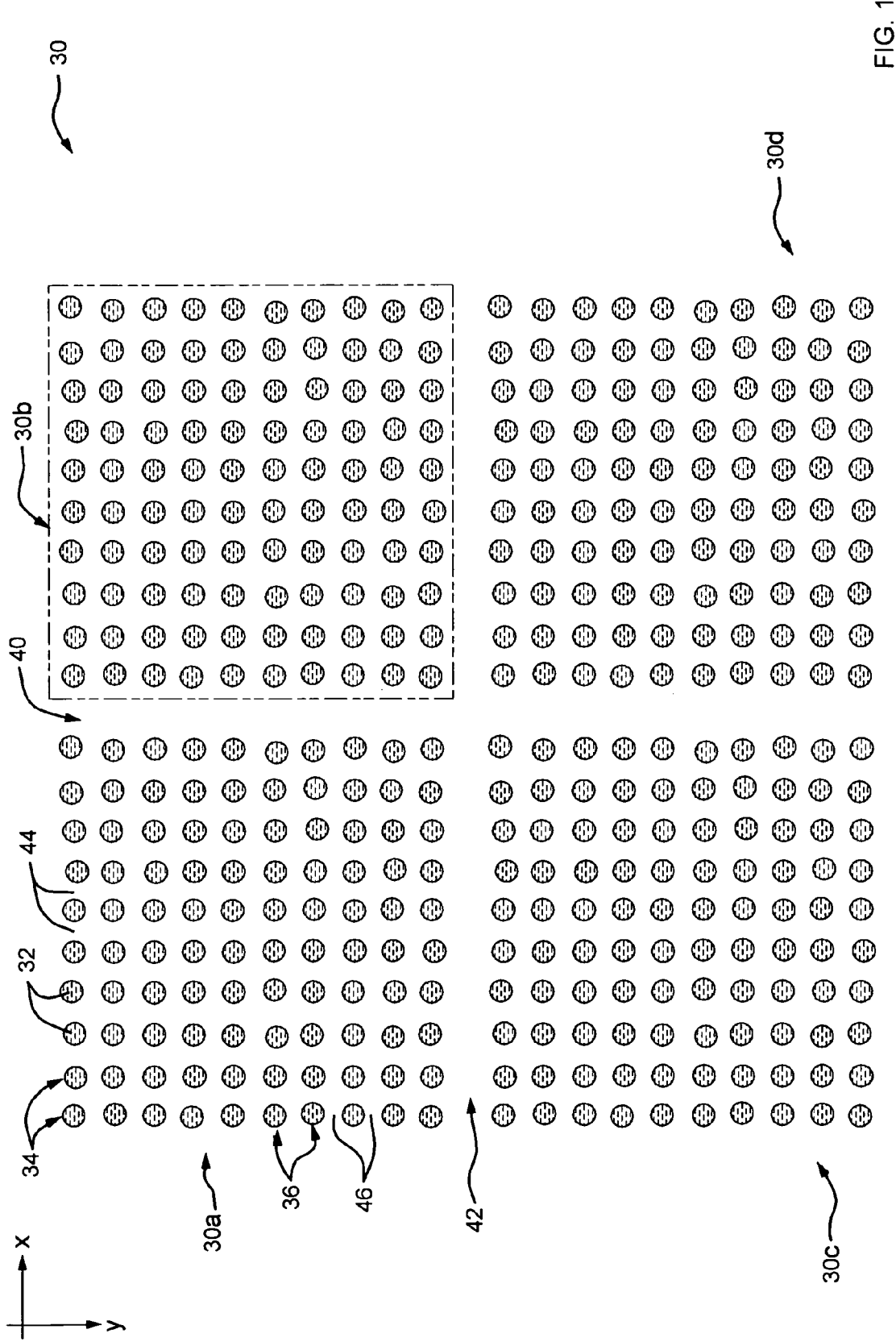
FIG. 1 is diagrammatic view of a microarray image composed of a plurality of sub-arrays, each consisting of a multiplicity of spots arranged in rows and columns and containing visible deviations from the ideal row and column geometries of such sub-arrays.

The present invention may be implemented as program instructions for configuring a microarray image analysis or quantitation workstation such as the one shown at 10 in FIG. 14. As shown there, workstation 10 may include a central processing unit (CPU) 12 which operates on program instructions in a memory 14 using a processor in CPU 12. A scanner 16 scans microarrays to obtain corresponding image data which may be stored in an image storage device 18 connected to CPU 12. A user may input instructions concerning the microarray image analysis by way of a keyboard 20 or a mouse 22 connected to CPU 12 and images and other data may be displayed on a monitor 23. Also, the workstation usually includes a printer 24 for printing images and data. Image data representing the nominal grid may be loaded into the workstation via a disk drive 26 and stored in memory 14 along with the program instructions for implementing the present invention.

Refer now to FIG. 1 which illustrates an exemplary microarray image 30 which is composed of a plurality of substantially identical sub-arrays 30a to 30d that are separated by sub-array gaps 40 and 42 in the vertical and horizontal directions. Each sub-array image includes a plurality of spots 32 that are arranged in columns 34 and rows 36 with vertical gaps 44 between the columns and horizontal gaps 46 between the rows. The gaps 44 and 46 may hereinafter be referred to also as column gaps 44 and row gaps 46. The array 30 is shown as containing only four sub-arrays, each of which comprises 10 columns and 10 rows. It should be understood, however, that a typical microarray may have many more sub-arrays each of which may contain up to ten thousand spots 32. In other words, there may be many columns and rows of image sub-arrays between the corner sub-arrays 32a to 32d in the array 30 and many more spots 32 in each block.

While ideally the spots 32 in each array 30 are neatly arranged in columns 34 and rows 36, in practice that is not the case. Rather, as discussed at the outset, the respective spots may be mis-placed with respect to the rows and/or columns due to positioning errors, scaling errors, tolerances and random errors of the microarray printing and scanning systems. As shown, for example, the spots in the first column of a given sub-array are not all precisely aligned. Also, the sub-arrays 30a to 30d may not be spaced evenly from one another because the pins in the spotter may be slightly bent. There may also be occasions when a spot 32 is missing from the array, as indicated by the spot 32' shown in phantom at the upper row near the right hand corner of a sub-array shown in FIG. 9.

The patterns of spots 32 in all of the sub-arrays 30a to 30d are usually essentially identical since the motion of the print head that locates each image block and each spot in a given block is essentially identical for all of the pins in the print head, through tolerances and random errors may introduce slight variations. The system and method for automatically segmenting the image are described below with respect to one block or sub-array. However, it will be apparent to those skilled in the art that the same method or a variation thereof may be applied sequentially or in parallel to multiple sub-arrays. Further, a segmentation grid calculated for one sub-array image may be used as a nominal starting point for the calculation of a grid for a next sub-array image, and so forth.

Figure 2:
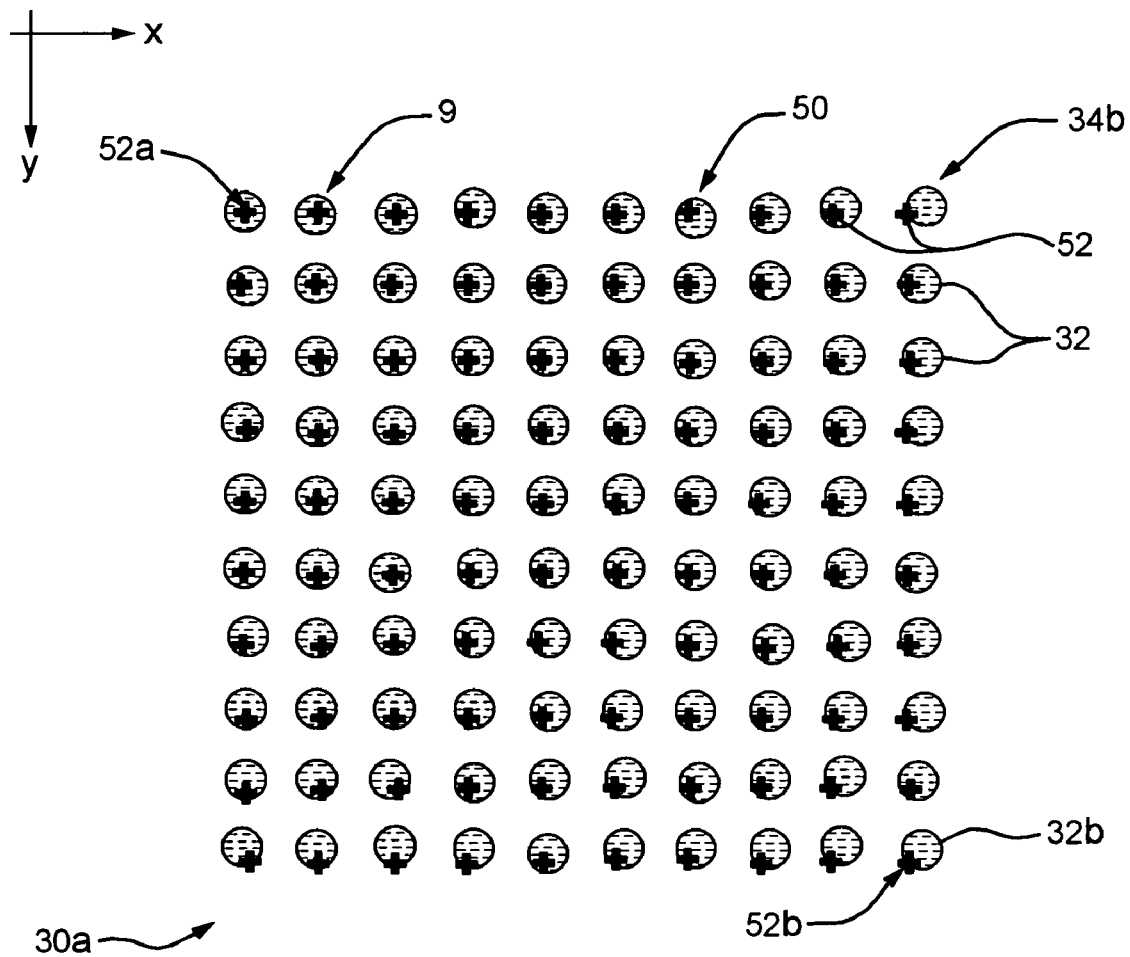
FIG. 2 is a diagramatic view of a sub-array image showing a nominal rectangular grid superimposed on the image.

Refer now to FIG. 2 which shows the image sub-array 30a illustrated in FIG. 1 with a nominal rectangular segmentation grid image 50 that consists of crosses 52 superimposed thereon. The crosses 52 are spot location markers that are intended to mark the center of the spots 32, and thus, the centers of respective image segments that include the spots. A given image segment includes one and only one spot. While the markers are shown as crosses, they could have a variety of other shapes such as circles, squares, polygons, or blank areas in any type of grid image. Also, grid lines that graphically define the segments (denoted by reference numeral 54 in FIG. 12) may but need not be displayed.

In FIG. 2, the nominal grid image 50 is shown superimposed over the sub-array image 30a at a location in which the left top corner marker 52a is aligned with the center of the top left corner spot 32a. Typically, the grid image is mis-aligned of the start of a microarray image analysis or quantitation operation, and the alignment depicted in the drawing is made by the user or the system at the start of the segmentation method describe below.

Figure 3:
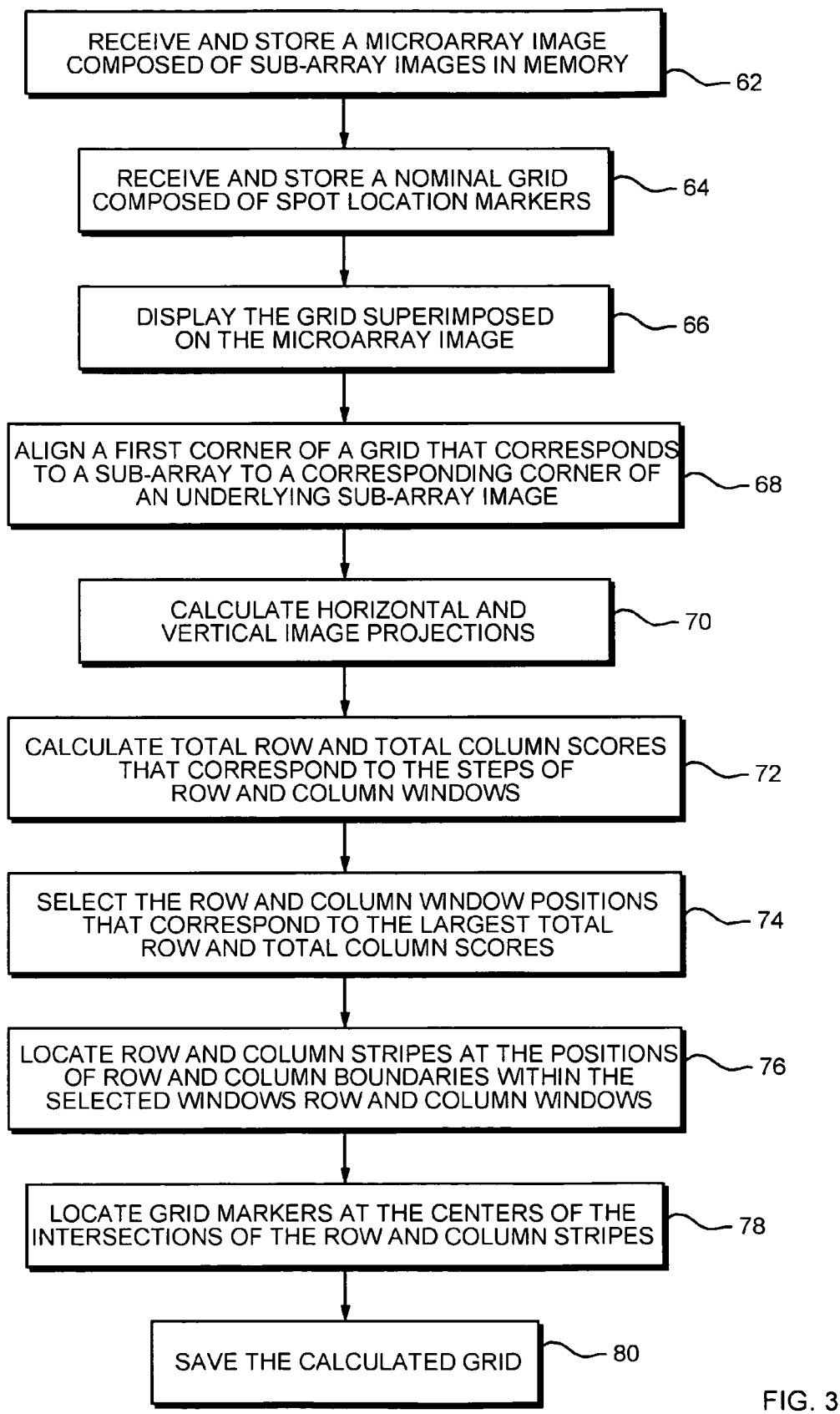
FIG. 3 is a flow chart of the steps for automatically locating spots in the sub-array image of FIG. 2 according to the invention.

Referring now also to FIG. 3, The microarray sub-array image 30a in FIG. 2 may be displayed on monitor 23 (FIG. 13) after the file for that image has been retrieved from storage device 18 and loaded into memory 14 in accordance with Step 62. The data for producing the grid image 50 may be stored on a disk and loaded into memory 14 by way of disk drive 26 so that the grid can be superimposed in an initial location on the sub-array image 30a displayed on monitor 23 as indicated by Step 66.

In accordance with the next step in the present method, i.e. Step 68, the super-imposed grid image is nominally aligned with the sub-array image. Using mouse 22, the entire grid image 50 may be dragged relative to sub-array image 30 so that the marker 52a at or near a corner of grid image 50 is centered on the spot 32a at or near a corresponding corner of the underlying sub-array image 30 as shown in FIG. 2. In that display, the spot 32a and marker 52a happen to be at the upper left hand corner of the display. However, they could just as well be located at or near some other corner. In the event that the corner spot designated for grid alignment is missing from the sub-array image 30a, the user may estimate the location where the missing spot would be and place the corresponding grid marker there.

Alternatively, the nominal alignment may be performed automatically by the system as part of the overall process of fitting a grid image 50 to the microarray 30. The alignment of the top left corner gird image and the sub-array image 30a is thus estimated through an initial search step, as discussed in more detail below.

In any event, after Step 68 the overall grid 50 is generally not yet aligned sufficiently well with image 30a to allow accurate spot quantitation. For example, as depicted in FIG. 2, the marker 52b for the last spot 32b in the right-most column 34b does not align with the center of the spot and indeed almost misses the spot entirely. The spot 32b may thus span two image segments, resulting in quantitation errors.

Figure 4:
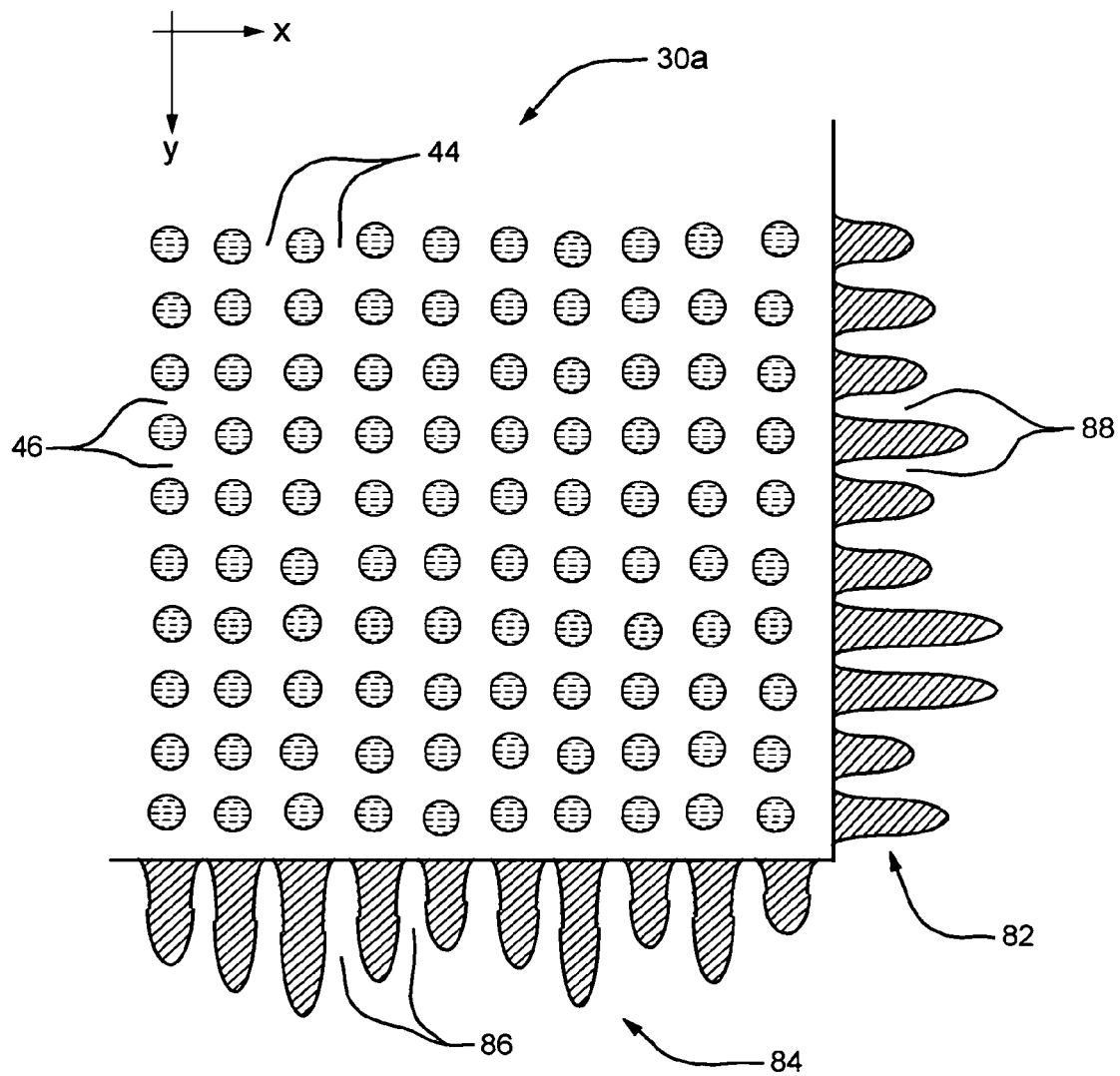
FIG. 4 is a view similar to FIG. 2 further showing vertical and horizontal projections.

Referring now also to FIG. 4, a next Step 70 in the method is to calculate image projections 82 and 84 in the horizontal and vertical directions, or in the directions of x and y coordinates axes. The image projections 82 and 84 are calculated as an accumulation of contributions of each of the pixels in the corresponding horizontal and vertical directions. The accumulation may be, for example, a sum of pixel intensities, an average of the pixel intensities, and so forth. The projections are depicted in the drawing as line graphs with the area beneath the line graphs indicated by cross-hatching.

Figure 10:
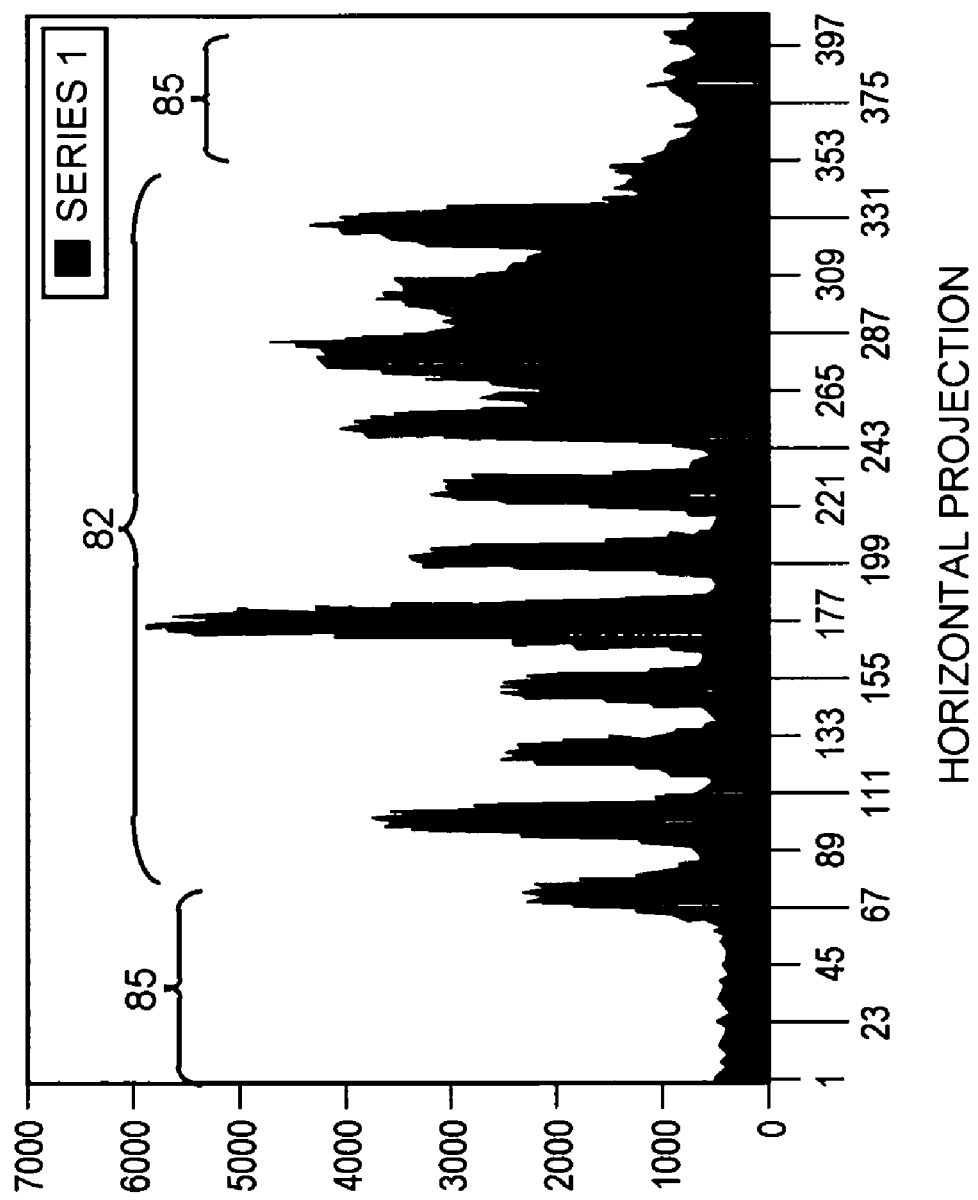
FIG. 10 depicts horizontal projections that correspond to the sub-array image of FIG. 9.
Figure 11:
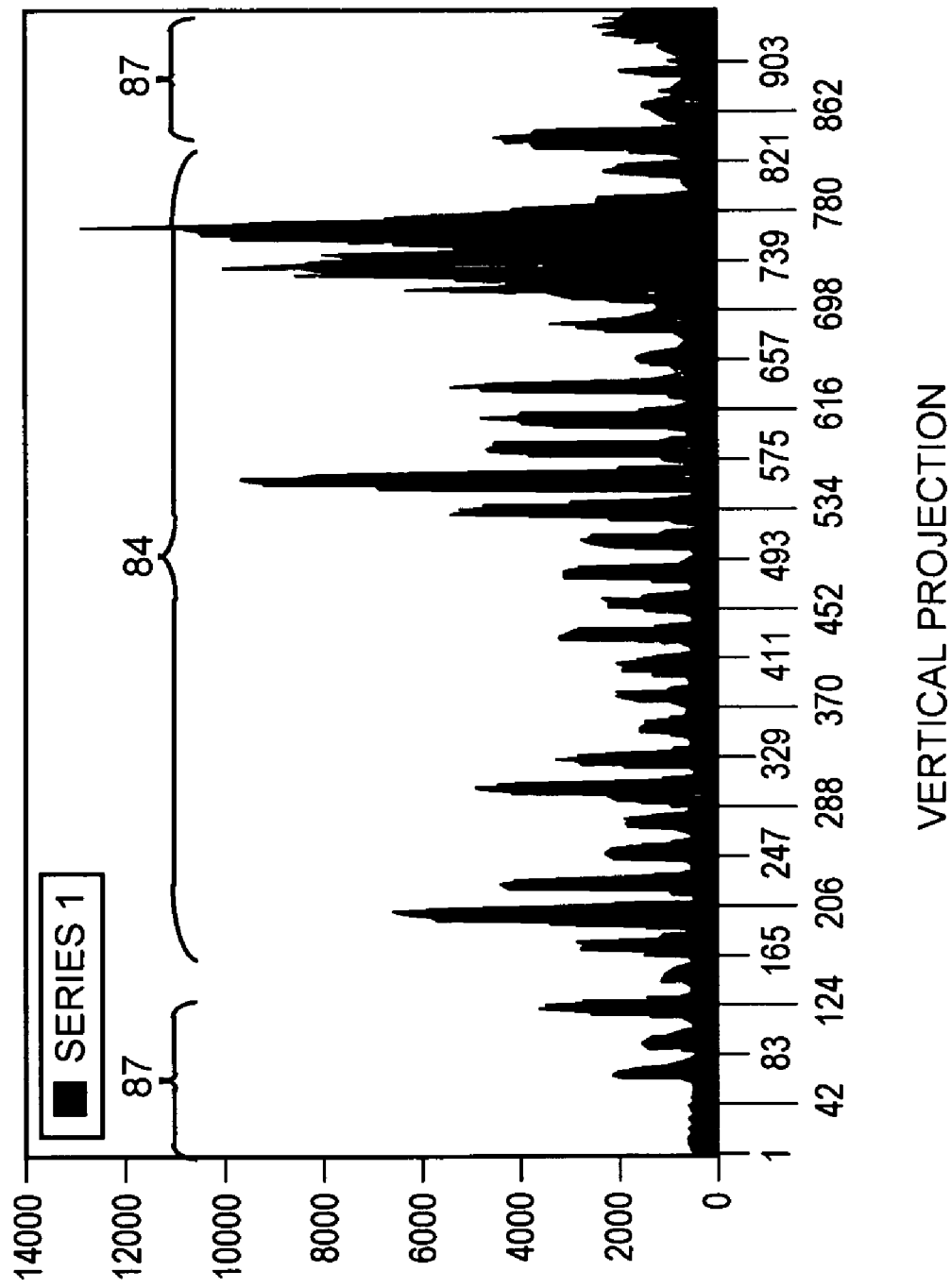
FIG. 11 depicts vertical projections that correspond to the sub-array image of FIG. 9.

The drawing depicts near zero-valued projections 86 and 88 for the vertical and horizontal, or column and row, gaps 44 and 46. However, the projections that correspond to the gaps are typically non-zero and may be significantly above zero due to noise and artifacts in the inter-spot, or background, areas of the image, as discussed in more detail below with reference to FIGS. 10 and 11.

Figure 5:
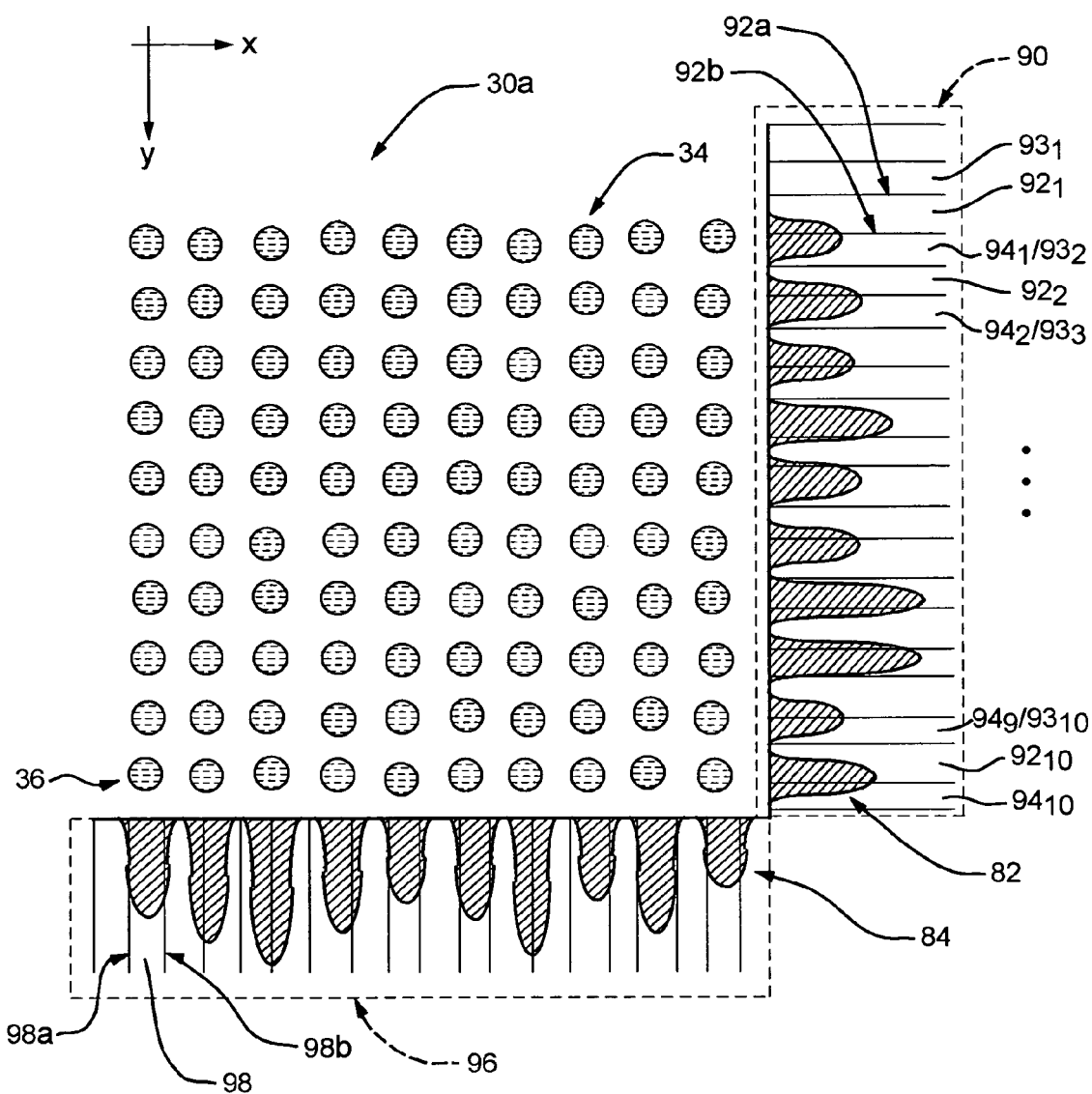
FIG. 5 is a view similar to FIG. 4 further showing a row window with row boundaries that correspond to nominal row spacings and spot size and a column window with column boundaries that correspond to nominal column spacings and spot size.

Referring now also to FIG. 5, a next Step 72 in the method is to calculate total row and total column scores using the row and column image projections 82 and 84, in order to more precisely locate the rows 36 and columns 34 of the sub-array image 30a. To do this, the system first steps a row window 90 over the horizontal projections 82. The row window 90 includes row boundaries 92 that are spaced from adjacent row boundaries by nominal row spacings or corresponding upper and lower gaps 93 and 94. As indicated, a given gap may be an upper gap for one row boundary and a lower gap for an adjacent row boundary. Each row boundary is denoted by an upper boundary line 92a and a lower boundary line 92b that are separated by the nominal spot size, and the corresponding upper and lower gaps are adjacent to the boundary lines.

At each step, the system calculates a total row score that is the sum of the individual row scores, where the respective row scores are representative of the areas of the horizontal projection curve portions 182 that fall within the corresponding row boundaries 92. The stepping and scoring process is explained in more detail with reference to FIG. 8 below.

Figure 6:
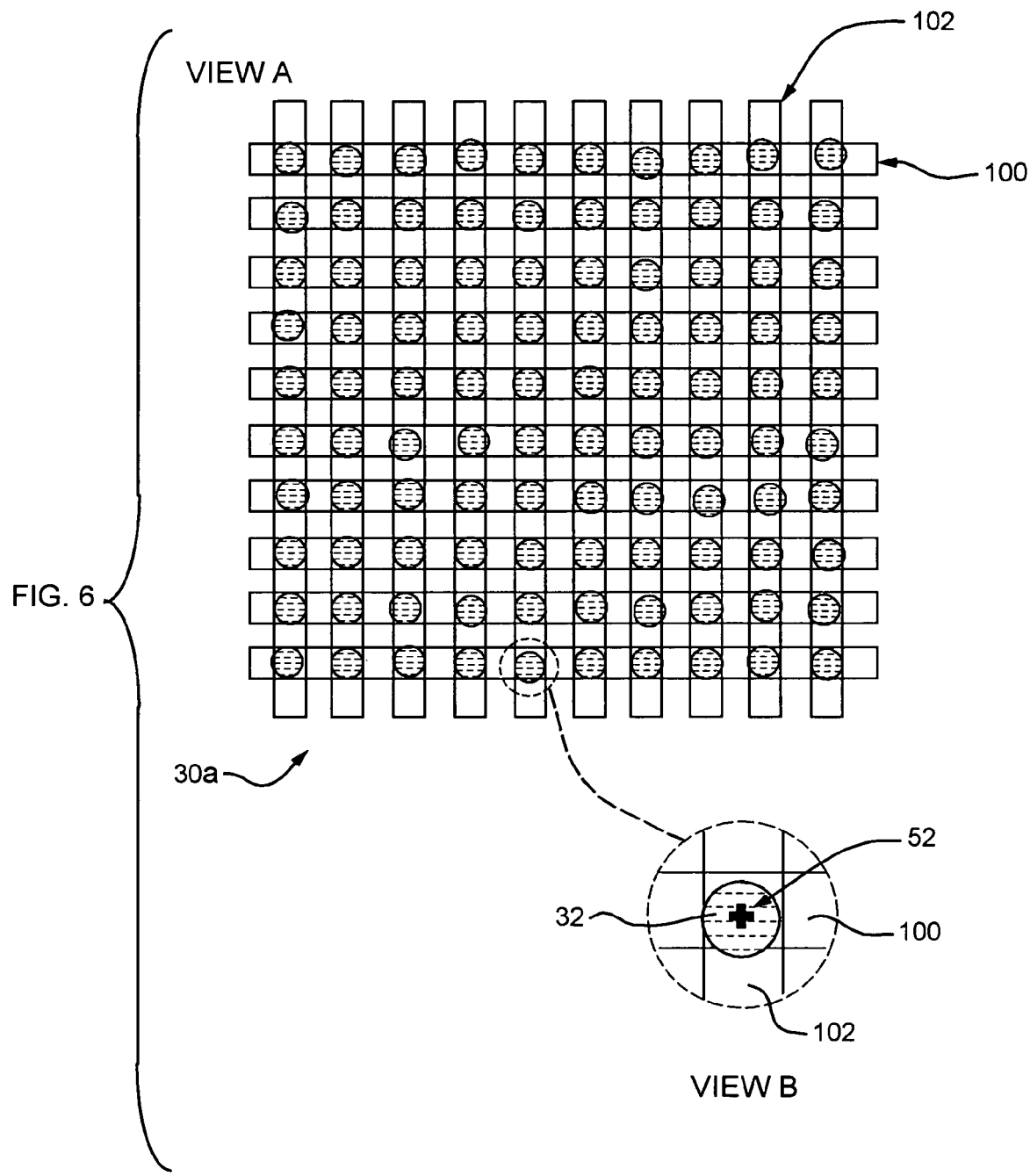
FIG. 6 is a view similar to FIG. 2 with column and row stripes illustrated.

Referring also to FIG. 6, the system next, in Step 74, selects the window position that corresponds to the largest row total score, and in Step 76 locates row "stripes" 100 at the locations of the respective row boundaries within the selected row window. Each row strip is as wide as the corresponding row boundary separation, here, the nominal spot diameter.

The same stepping process (Step 72) is repeated over the vertical projections 82 with a column window 96 that includes column boundaries 98 that are spaced and sized to correspond to the nominal column spacing, or gap, and the nominal spot size, respectively. The system selects (Step 74) the column window position that corresponds to the largest total column score, and sets (Step 76) the locations for column stripes 102 to correspond to the positions of the respective column boundaries 98 within the selected column window.

Referring still to FIG. 6, the row boundaries 92 define a plurality of row stripes 100 that are one spot wide, and the column boundaries 96 similarly define column stripes 102 that are one spot wide. As a next Step 78, the system locates the grid markers 52, which designate the centers of the segments for quantization, at the centers of the intersections of the row and column stripes 100 and 102. As shown, the respective intersections of the stripes, and thus, the respective locations of the markers, are associated with individual spots 32.

Figure 7:
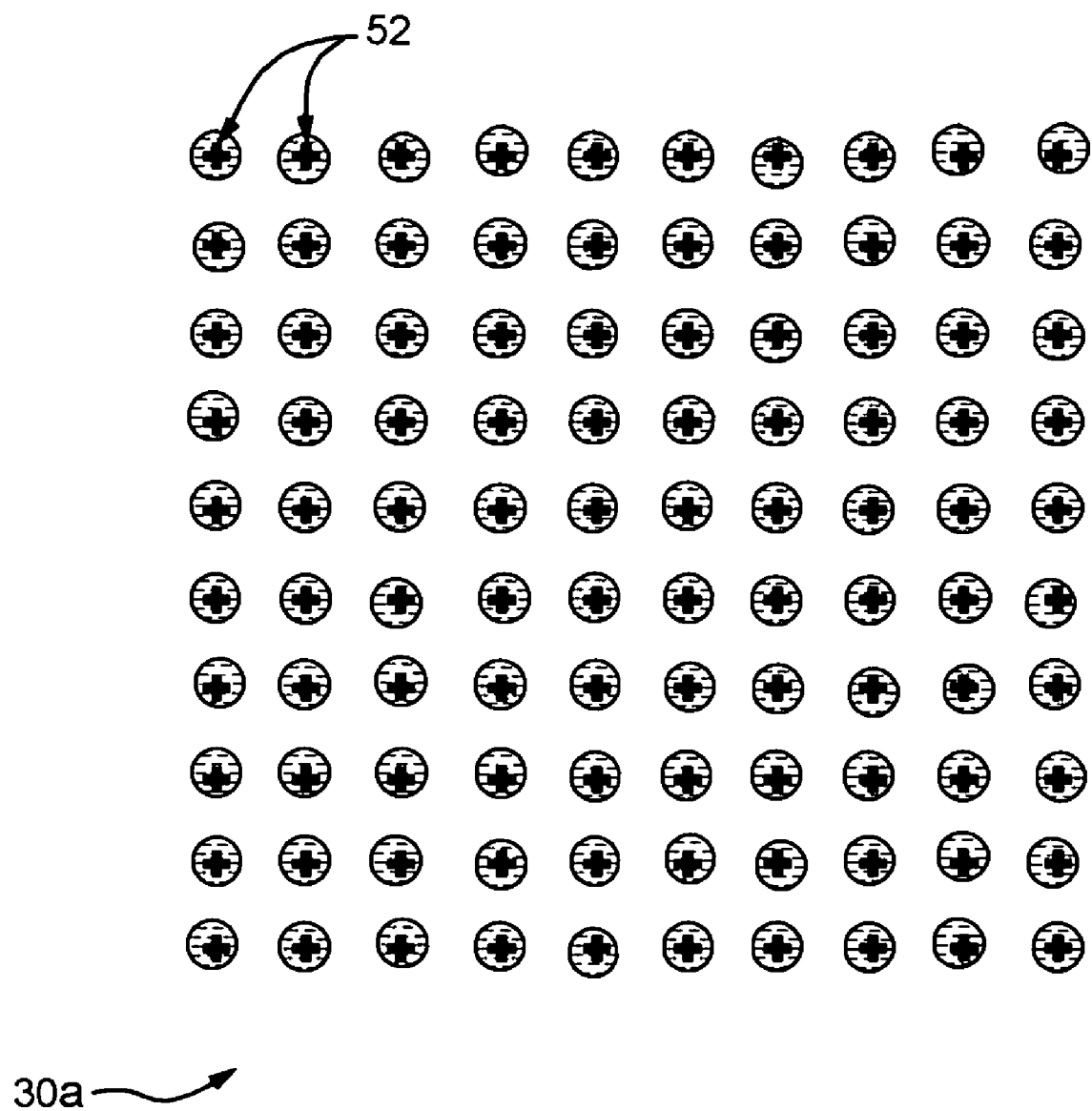
FIG. 7 is a view similar to FIG. 2 with a calculated grid superimposed thereon.

FIG. 7 depicts the sub-array image 30*a* that has superimposed thereon a calculated grid image 50' that corresponds to the row and column stripes of FIG. 6. While the grid markers 52 may not always indicate the centers of the respective spots 32, the markers are close enough to the spot centers to avoid errors in the quantitization due to incorrect image segmentation.

Figure 8:
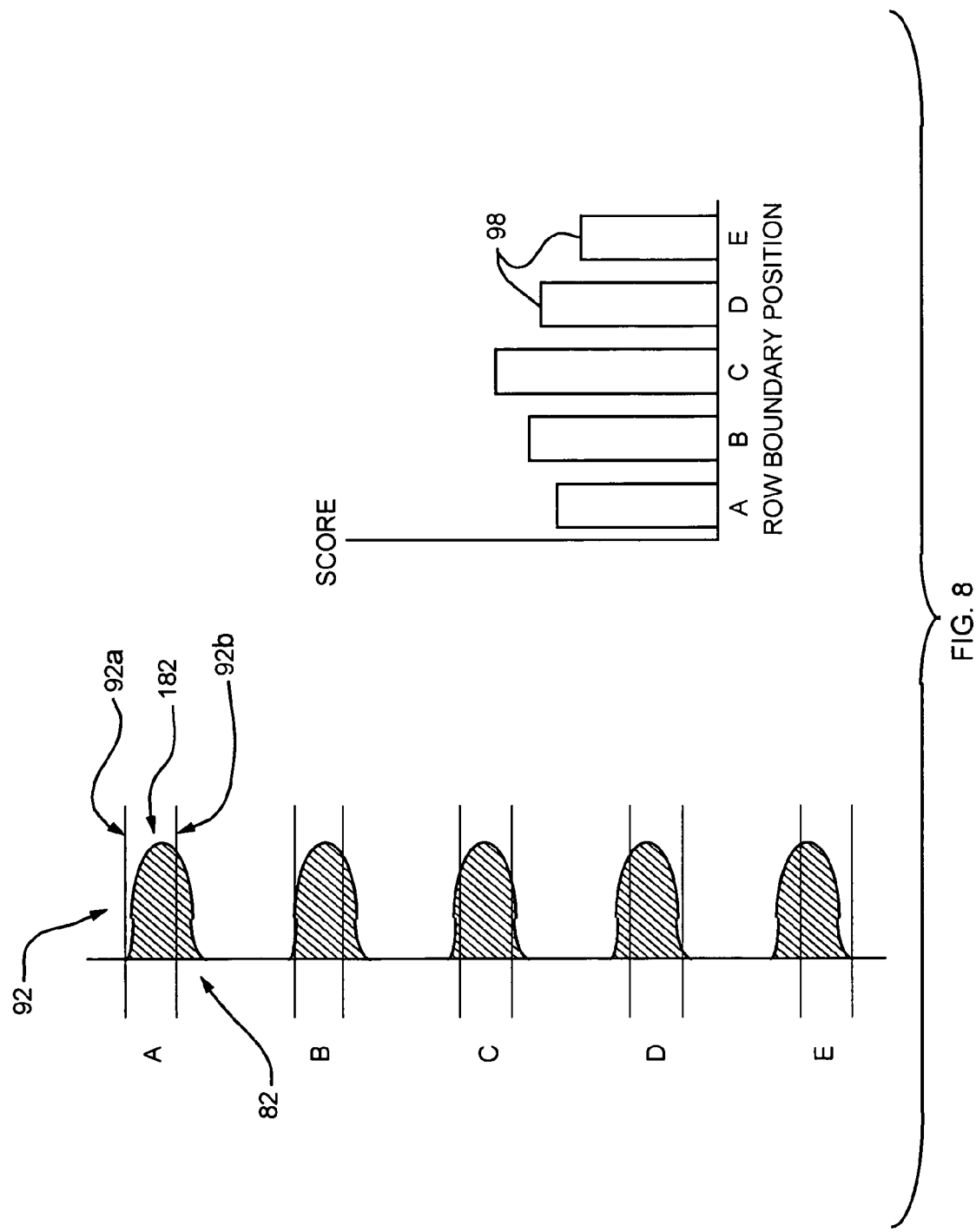
FIG. 8 illustrates the successive steps of a row boundary to accomplish the objectives of the invention.

For ease of understanding, the stepping process is described in more detail in FIG. 8 with respect to a single sub-array image row 34. As depicted in the drawing, a row boundary 92 is represented by lines 92*a* and 92*b* that are spaced apart by a nominal spot size, or spot diameter. The boundary is stepped in steps that are fractions of a spot diameter over a portion 182 of the projection curve 82 that corresponds to the selected row. In the example, the step size is one pixel. At each step the system calculates a row score that represents the area under the portion of the projection curve that is within the boundary lines 92*a-b*.

The row scores for several steps are depicted graphically as bars 98 in the drawing. The largest row score corresponds to the boundary location that includes the portion of the projection curve that consists of the largest contributions from the most spots 32 in the row. Thus, the row stripe 100 that corresponds to position C more fully intersects the largest number of the spots in the row.

The system preferably starts the stepping process from a position specified by the placement of the nominal grid image 50 relative to the sub-array image. The system then steps the column and row windows through a space that corresponds to at least a nominal spot size. As discussed in more detail below with reference to FIG. 9, the system may annex "dummy" rows and columns to the sub-array image, to ensure that the starting point of the calculations is not shifted beyond the underlying sub-array image by one or more rows or columns. As is also discussed in more detail below, the row and column scores are preferably calculated with contributions from the associated row and column gaps 44 and 46 (FIG. 4), such that the system can distinguish the rows and columns from artifacts that encompass multiple spots, rows and/or columns.

Once the row and column stripes 100 and 102 have been set to the locations that correspond to the maximum total row and total column scores and the locations for the markers 52 have been determined, the system in step 80 saves the calculated grid and thereafter may use the calculated grid as the nominal grid image for an adjacent sub-array, such as sub-array 32*b* (FIG. 1). As discussed, each sub-array is essentially identical, though there may be differences in spot locations due to tolerances, bent pins, and random errors, and there may also be variations in the sub-array gaps 40 and 42 that separate adjacent sub-arrays. The system repeats the calculations for the next sub-array, determining the highest total row and total column scores in order to locate the rows and columns, and so forth. The system may also use the saved calculated grids for all of the is sub-arrays that constitute the microarray 30 as a nominal grid for a next microarray produced by the same scanning and printing system.

As discussed above, the system may automatically perform a nominal alignment (step 68) of the grid image 50 and a first sub-array, in the example, the top left sub-array 30*a*. The system calculates the vertical projections, for the columns that correspond to the initial location of the grid and also for additional columns that are part of a predetermined search range—in the example, two nominal columns to the right and to the left of the grid.

Next, the system fits the column boundaries to the projections by determining the maximum total score, as the column boundaries are stepped from their initial location across the search range. While the initial grid location may be off by one or more rows, such that contributions from spots in one or more of the top rows of the sub-array are not included in the vertical projections and contributions from spots in one or more rows of an adjacent array are included, the system can still estimate the locations of the columns with sufficient accuracy for a nominal alignment of the grid in the horizontal direction. The system then calculates the horizontal projections for the rows that correspond to the grid and associated row search range, in the example two rows above and two rows below, and steps the row boundaries over the search range, to determine a nominal alignment in the vertical direction.

The system then positions the grid in accordance with the estimated column and row positions and moves the remaining grid images, to align the grids nominally with the underlying sub-array. The system may then calculate horizontal and vertical projections for the nominally aligned grids, to continue with the grid fitting process (steps 70-80) described above.

Figure 9:
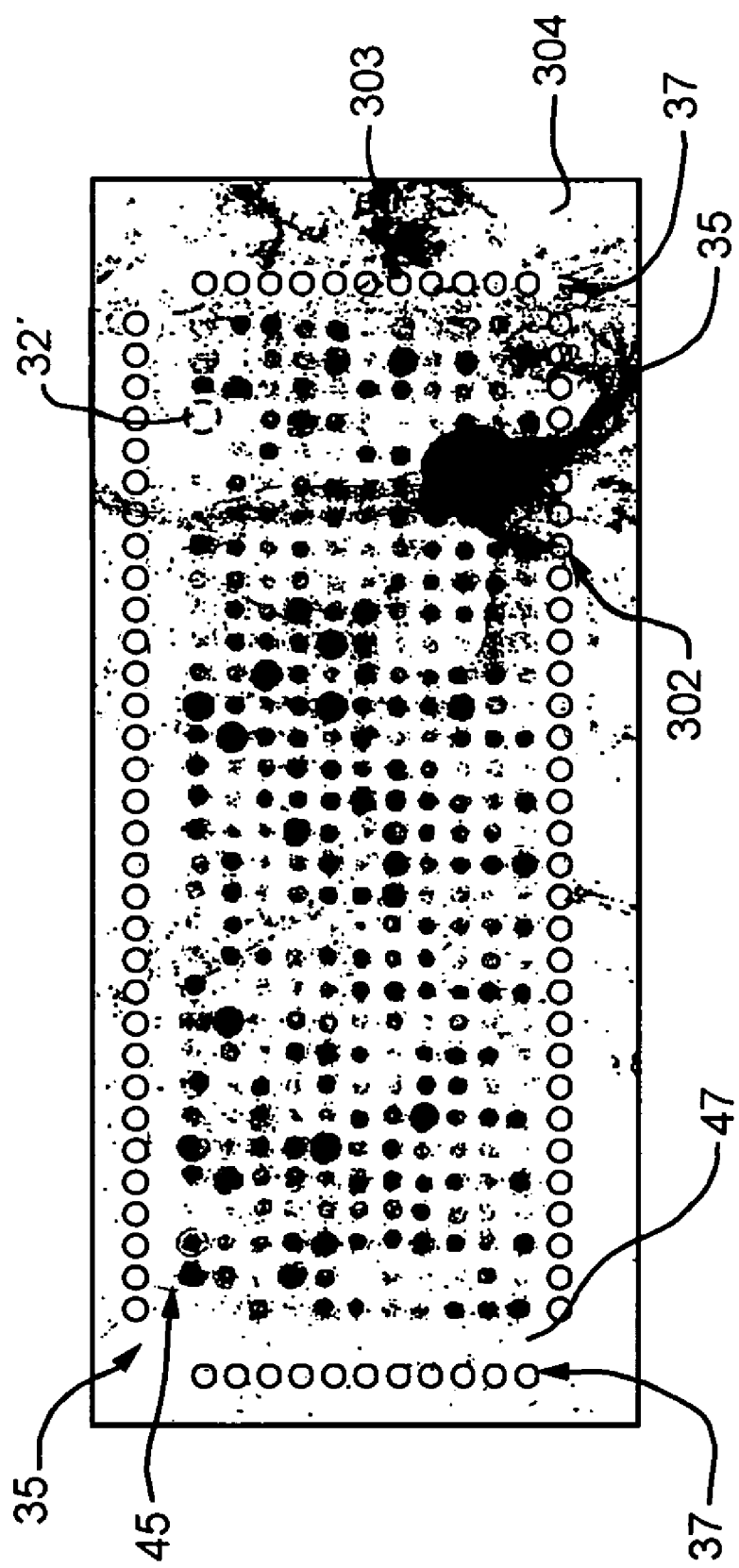
FIG. 9 is a view of a microarray sub-array image that contains artifacts and dummy columns and rows.

As an example of the operation of the method, consider the microarray sub-array image 300 depicted in FIG. 9. The sub-array image has 11 rows 36 and 31 columns 34 and includes a relatively large artifact 302 that encompasses multiple rows and columns and their adjacent gaps 44 and 46, as well as multiple spots 32 within respective rows and columns. The sub-array image also includes smaller artifacts, referenced generally as 303, in the background 304 of the image. As discussed above, the system imposes on the sub-array image a nominal grid image 50 (FIG. 2) which is based on parameters of the microarray image that are supplied by the user or through a computer-readable file or record, such as a .gif file or a database table. The parameters of interest include the nominal spot size or diameter, the sub-array arrangement and dimensions, such as, the numbers of rows and columns, nominal column and row gap spacings, and nominal sub-array gap spacings. The user or the system may then rotate the grid image slightly so that the pixel space of the sub-array image and the row and column directions, that is, the coordinate x and y axes of the grid, are well aligned. In the example, the sub-array image has dimensions of w pixels in the horizontal direction and z pixels in the vertical direction.

The system next determines the microarray image projections in the vertical and the horizontal directions as:

$$V(j) = \sum_{i=1}^{z} I(i, j)$$

where $1 \leq j \leq w$ and I is, in the example, pixel intensity, and $$H(i) = \sum_{j=1}^{w} I(i, j)$$

where $1 \leq i \leq z$.

To check that the grid image 50 is correctly aligned with the sub-array image 300, and not displaced by one or more columns and/or one or more rows, the system also calculates horizontal and vertical projections 83 (FIG. 10) and 85 (FIG. 11) for contributions from peripheral, or dummy, rows 35 and peripheral, or dummy, columns 37 that are positioned above, below and to the right and left of the rows and columns that correspond to the grid image. The dummy rows and columns are separated from adjacent rows and columns by nominally sized dummy row and column gaps 45 and 47. The row and column windows 90 and 96 (FIG. 5) are similarly expanded to include boundaries 92 and 98 for the dummy rows and columns. The system then determines, for example, the total row scores for the respective row window positions by subtracting the row scores associated with the dummy rows from subtotals that are sums of the scores for the individual rows that correspond to the grid columns.

The system thus calculates a total row score for a given window position as:

$$S = \left(\sum_j R_j - FxR_{Dup}\right) - FxR_{Ddown}$$

where $R_j$ is the ratio:

$$R_j = \frac{Spot_j}{Ugap_j + Lgap_j}$$

and $Spot_j$ is the average of the horizontal projection in the nominal spot location, i.e., the average area within the applicable row boundary 92, and $Ugap_j$ and $Lgap_j$ are the averages of the projections in the associated upper and lower row gaps 93 and 95; $R_{Dup}$ and $R_{Ddown}$ are the ratios for the associated upper and lower dummy rows; and F is a function that is based on the number of columns in the underlying sub-array. Since the dummy ratios are compared with the sum of the ratios associated with all of the grid columns, the dummy ratios are weighted to avoid mistaking rows or columns of dim spots for sub-array gaps.

If the nominal grid image 50 is aligned with the sub-array image 300, the projections 85 and 87 associated with the dummy rows and columns 35 and 37 encompass relatively small areas since the dummy rows and column correspond to the sub-array gaps 42 and 40. If the grid 50 is mis-aligned with the image sub-array, one or more of the dummy rows and/or columns will instead include image spots and the associated projections will thus encompass larger areas.

Accordingly, the system determines if the grid image is properly aligned in the vertical direction with the sub-array image if the sub-total that is the sum of the individual row scores does not differ significantly from the total row score that includes the contributions from the dummy rows. Otherwise, the system may shift the grid one row in either direction and re-calculate the corresponding total row score. The system may instead continue stepping the row window and ultimately select the overall maximum total row score, since the subtracted dummy row scores will adversely affect the total scores only if the grid image is mis-aligned vertically with the sub-array image. The system also performs the same calculations to determine if the grid is shifted one or more columns to the left or right.

The system continues stepping either or both of the windows 90 and 96 beyond the assumed location of the sub-array if the row and/or dummy column scores remain relatively high, indicating that the grid image 50 may span two adjacent sub-array images. The system may thus iteratively step the windows up to one half the total number of rows or columns and calculate and compare the corresponding total scores, to detect when the grid no longer spans the two sub-array images. The system may instead check areas of the underlying image in which the projection scores are suspect, that is, the areas for which the scores associated with adjacent rows or columns are low enough that they could indicate a sub-array gap. As long as the sub-array gaps are at least 1.5 times the nominal spot size, the system will locate the sub-array gaps by accurately placing the grid image in a location that is dictated by row and column window positions that maximize the total row and total column scores.

Figure 12:
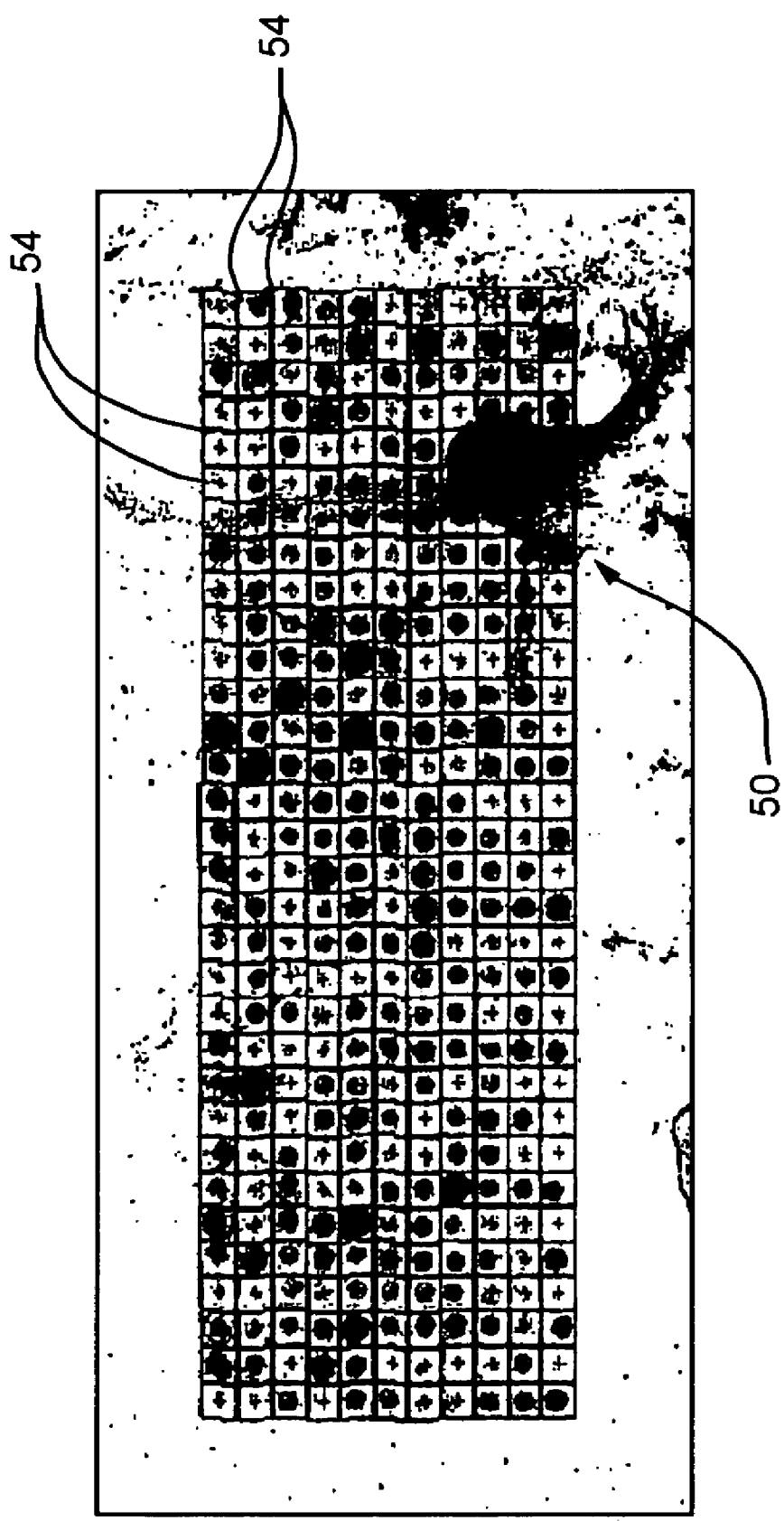
FIG. 12 depicts the sub-array of FIG. 9 with grid lines and spot location markers superimposed thereon.

Once the locations for the row and column stripes 100 and 102 are determined, the system places the grid markers 52 in locations that correspond to the centers of the intersections of the stripes, as discussed above. FIG. 12 shows the grid lines 54 and grid markers 52 calculated for the sub-array image 300 of FIG. 9.

If the user requires more precision, the system may further determine a calculated separation for the row and column boundary lines 92a-b and 98a-b, that is, the width of the row and column stripes, to determine a more precise spot size. The system thus recalculates the total row and total column scores associated with the calculated grid using various sizes of boundary line separations, and selects the separation size that maximizes the total row and total column scores. For example, the system may use a range of separations that match user-defined parameters of, for example, 0.7 to 1.3 times the nominal spot size, and step row and column windows 90 and 96 over a search space that corresponds previously to the calculated segments. The system may instead do the recalculations using various row and column gap spacings.

To accommodate uneven row and column gaps, the system may also use various gap spacings to determine the individual row and column scores that contribute to the total scores during the row and column location operations. The system may thus calculate several values for, for example, a given column, using various column gap sizes. The system then selects for inclusion in the total column score the maximum value $R_i$:

$$R_i = \max_i \{r_{ij}\} \text{ where}$$

$$r_{ij} = \frac{Spot_i}{LGap_{ij} + RGap_{ij}}$$

Figure 13:
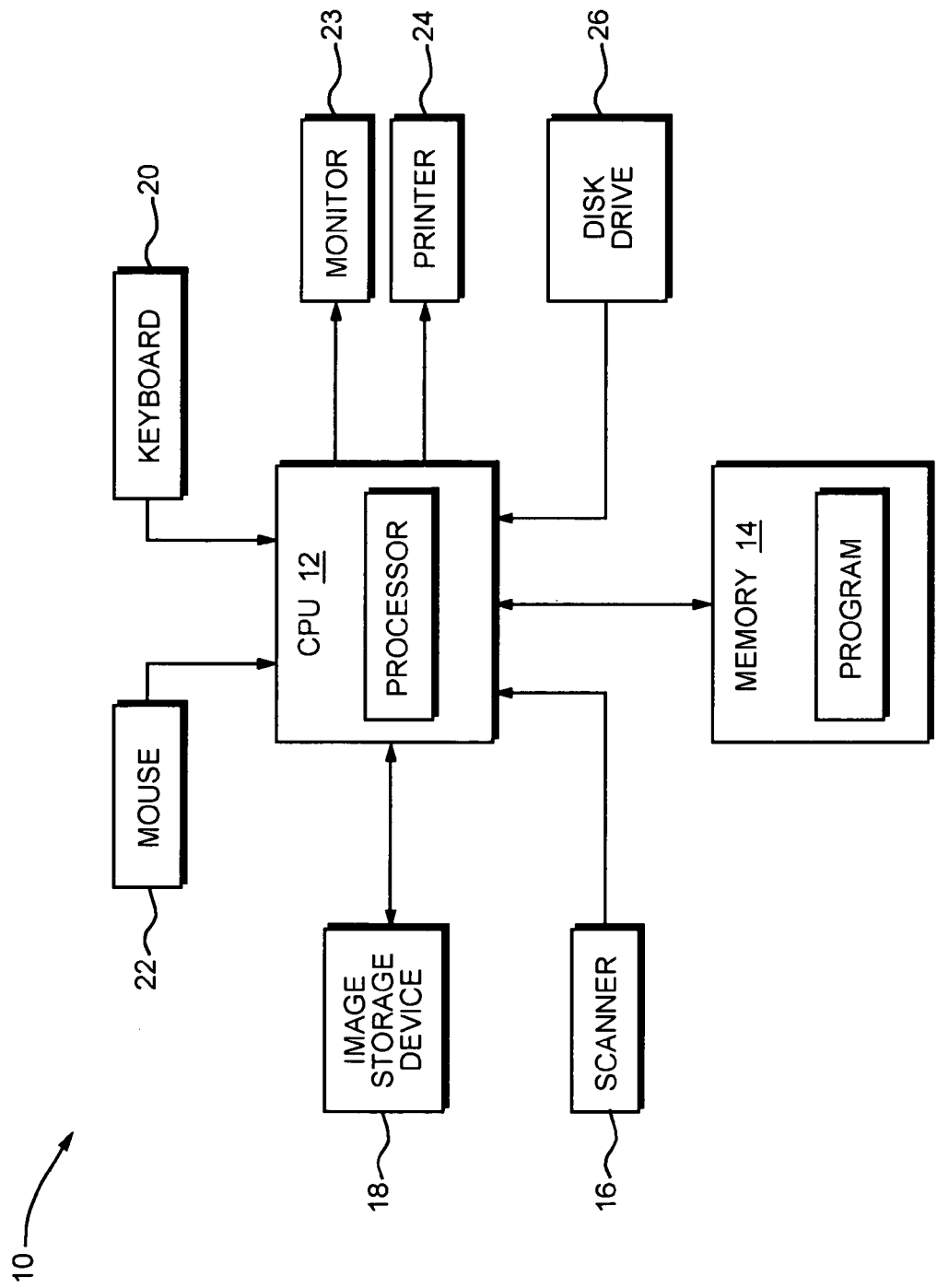
FIG. 13 is a block diagram showing apparatus for carrying out the present method.

Once the grid image 50 has been modified as described above to produce the calculated grid image 50', the system stores the calculated grid image in memory 14 (FIG. 13). The system may then quantize the microarray spots that are delineated by grid markers 52 in the usual way by calculating the mean, median or mode of the spot pixels or by any known spot quantitation methods. Other values may also be calculated for each spot region, or segment, such as, for example, spot size, shape, signal variation (e.g. standard deviation of brightness), the background level, the variation in the background level, the distance of the spot segment from the nominal grid, and so forth.

The spot pattern in a microarray image may be rotated slightly with respect to the pixel matrix in the electronic image, that is, in the nominal grid image. This can occur if, for example, the microarray substrate is angularly misaligned or tilted slightly in the microarray spotter or scanner. With the rotation, the row and column, or horizontal and vertical, projections created in the pixel matrix space will not represent the projections that would generate the highest total row and column scores. Accordingly, the system may search through various rotations of the nominal grid image 50 with respect to the microarray image pixel matrix, to determine a rotational position for the calculated grid as well as the locations of the grid rows and columns.

Known methods are used to iteratively rotate the nominal grid image through various angles and total row and column scores are calculated for each orientation. The system then selects the rotational position that provides the overall largest total row and total column scores. The system thus determines rotational orientation as well as column and row locations for the grid image by including in the method flow chart of FIG. 3, after Step 74 and before Step 76, the additional step of iteratively rotating the grid image and performing the calculations to select a set of maximum total row and total column scores for each rotated position. The method then continues with the selection of the overall largest set of total row and total column scores to determine not only row and column locations but also rotational positions. Specifically, in Step 76 the system now selects the maximum total scores from the set of scores determined in Step 74 and the sets of scores determined for the rotated positions and ultimately uses the associated row and column window positions to orient and locate the row and column stripes.

The methods may be used with single-color images or composite images created from multiple images for multi-color scans of a single microarray. Composite images, which are routinely created and displayed during microarray analysis, as averages, weighted averages, maxima, sums or the like of their constituent single-color images, provide the advantage of using a sub-array image in which more of the spot locations are likely to have significant signal contributions. Thus, the composite image row and column projections are more likely to have relatively higher peaks and the gap projections are more likely to have relatively lower valleys, providing even more robustness to the method.

As discussed, the methods are described above with respect to a single sub-array. The methods, and in particular, the steps involving the search for the sub-array gaps 40 and 42 may be used also to automatically locate sub-arrays within the microarray. The system may instead locate the sub-arrays by comparing the dummy column and/or row scores with the scores for the columns and/or rows at the edges, or border, of the nominal grid and shifting the grid if the dummy scores are relatively large compared to the scores of the edge, or border, rows and/or columns, to first nominally align the grid and sub-array images before performing the steps to determine the row and column locations.

The fitting process (steps 70-80) may also be expanded by considering "regions" of the microarray 30 or, as appropriate, regions of the respective sub-arrays 30a-d. A region is defined by the nominal position and footprint (or extent) of an appropriately-sized grid plus a predetermined search range, for example, four rows and four columns beyond the grid. To speed up calculations, the system divides a large sub-array (e.g., more than 15000 microns long or wide) into several regions.

The system calculates row and column projections per region, then determines maximum total row and total column scores for the respective regions by stepping associated row and column windows over the search ranges as described above. The system thus determines the parameters for column/row position, column/row spacing, and column/row spot diameter for each region. The regions may also be sub-divided into local regions, such that, for example, a four column or four row search space is divided into eight local search ranges in 0.5 column or 0.5 row increments. The maximum scores are then calculated for the respective local regions, to determine the associated parameters. For interstitial arrays, the row and column projections are calculated at approximately ±45 degrees.

The system next chooses the best column and row parameters, i.e., position, spacing, and spot diameter, for all of the sub-arrays by combining the maximum scores associated with the respective sub-arrays so as to select the parameters that are most consistent with the nominal microarray pattern i.e., nominal spacing between sub-arrays, nominal spacing between spots, and nominal spot diameter.

The system thus calculates a column position score as:

$$S_{cpos} = \Sigma(S_c(i,j) - PosPenalty(i,j))$$

where $S_c(i,j)$ is the maximum total column score associated with a candidate column window position for the sub-array located at column i and row j of the sub-array matrix that forms the microarray and PosPenalty (i,j) is a penalty value associated with a position change, i.e., a distance, of the sub-array column window relative to those of the sub-array neighbors (upper, lower, left, right) and relative also to the nominal position.

The system selects the column window positions for the sub-arrays closest to the top left first and, using a search tree, selects the column window positions of all of the sub-arrays. The search starts at a root which is the nominal position of the column window of the top-left sub-array and tests the respective candidate positions. The system thus chooses the candidate positions for the respective nodes, and calculates corresponding column position scores, and selects as the best sub-array column positions those that correspond to the highest column position score. The system repeats the search for the best row window positions.

For speed, the search space is limited and the system determines the position penalty using a single neighbor. In the example, the system uses the horizontal, or x, distance from a left neighbor to calculate the position penalty for all sub-arrays except those in the first column, for which the system uses the horizontal distance from is the location of the upper neighbor. Accordingly, the position penalty for a sub-array in the first column is:

$$PosPenalty(i,0) = |(x_{pos}(i,0) - x_{pos}(i-1,0)) - (x_{posnm}(i,0) - x_{posnm}(i-1,0))| * P$$

where "*" represents multiplication, $x_{pos}$ (i,0) is a horizontal position component for a column window that corresponds to the sub-array in the $i^{th}$ row of the $0^{th}$ column of the sub-array matrix, $x_{posnm}$ is the horizontal position component of the nominal position and P is a calculated value that is related to the average score for the matrix column, that is, the average of the associated local best scores for the sub-arrays in the same matrix column, and $$P = col_{ave} \times \left(\frac{N_{col} + c}{c}\right)$$

where $col_{ave}$ is the column average score, $N_{col}$ is the number of columns in a sub-array and c is a constant. The position penalty for a sub-array in any other matrix column is calculated as $$PosPenalty(i,j)|_{j \neq 0} = |(x_{pos}(i,j) - x_{pos}(i,j-1)) - (x_{posnm}(i,j) - x_{posnm}(i,j-1))| * P$$

To speed up the search, the position penalty distance calculation is limited to one nominal column spacing and only the best 2 or 3 positions for a given sub-array are considered as position candidates. The calculations for the row parameters are similarly limited.

It will thus be seen that the objects set forth above, among those made apparent from the preceding description, are efficiently attained. Also, certain changes may be made in carrying out the above method and in the construction set forth without departing from the scope of the invention. For example, the method steps may be performed in different orders, with the locations of the column stripes being calculated before the locations of the row stripes, or the locations of the column and row stripes may be calculated simultaneously. The method may include manual alignment of the nominal grid for a first sub-array and automatic alignment for adjacent sub-arrays, the calculations involving dummy row and columns may be performed selectively depending on the locations of the sub-arrays in the microarray, and only dummy rows or dummy columns may be included in the calculations for sub-arrays on the borders of the microarray. The method may also be performed without first calculating the image projections, by calculating the total scores based on the manipulation of applicable pixel values. It is therefore intended that all matter contained in the above description or shown in the accompanying drawings shall be interpreted as illustrative and not in a limiting sense.

It is also to be understood that the following claims are intended to cover all of the generic and specific features of the invention described herein.

One skilled in the art will appreciate that all or part of systems and methods consistent with the present invention may be stored on or read from machine readable media, for example, storage devices such as hard disks, CD-ROMs, flash drives; or other forms of tangible types of memory devices currently known.

What is claimed is:

1. A computer-readable storage medium having stored thereon a program for executing a method for determining spot locations on a microarray image, the method including the steps of:
   A. calculating horizontal and vertical image projections as accumulations of pixel contributions in horizontal and vertical directions;
   B. fitting one of a set of row boundaries and a set of column boundaries to the horizontal or vertical image projections to maximize a total score that is based on the accumulations and corresponds to the areas of the projections within the boundaries;
   C. fitting the other of the set of row or column boundaries to the horizontal or vertical image projections to maximize a total score that is based on the accumulations and corresponds to the areas of the projections within the boundaries;
   D. defining row and column stripe locations that correspond to the locations of the respective sets of row and column boundaries and associated gaps; and
   E. determining spot locations as the intersections of the row and column stripes.

2. The method of claim 1 further including the step of using a nominal grid of spot locations as initial conditions for one or both of the relative spacings of the row and column boundaries, and the separations of the respective boundaries.

3. The method of claim 2 wherein the nominal grid is formed using spot sizes and row and column gaps supplied by a user.

4. The method of claim 2 wherein the nominal grid is formed using spot sizes and row and column gaps supplied by a computer readable record.

5. The method of claim 2 wherein the nominal grid is formed from results of a previous application of the method.

6. The method of claim 2 further including
   a. dividing the microarray image into a plurality of regions, each of which includes the nominal grid and a search space,
   b. in the steps of fitting the row and column boundaries within the search spaces, fitting the row and column boundaries to the respective regions to determine maximum row and column total scores,
   determining best sets of parameters for the regions based on the total scores and the relative changes in the parameters from their nominal values.

7. The method of claim 6 wherein the step of determining best sets of parameters includes determining the changes in one or more of either or both of the positions of the columns and rows, either or both of column and row gap sizes, sub-array gap sizes, and spot sizes.

8. The method of claim 7 wherein the step of determining best sets of parameters tests multiple sets of parameters for each of the respective regions to determine best sets of parameters for the associated grid.

9. The method of claim 2 further including
   in the step of calculating image projections, accumulating contributions of pixels in rows and columns that are peripheral to row and columns that correspond to edges of the nominal grid, and
   shifting the location of the nominal grid if the scores associated with the peripheral rows, columns or both are relatively large with respect to the scores associated with the rows, columns or both that correspond to the nominal grid.

10. The method of claim 9 wherein the step of shifting includes determining if the peripheral row scores, column scores or both exceed a threshold and if so shifting the grid.

11. The method of claim 9 wherein the step of shifting includes determining if the peripheral row scores, column scores or both are greater than the scores associated with the rows, columns or both at the edges of the nominal grid and if so shifting the grid.

12. The method of claim 9 wherein the steps of fitting the row and column boundaries includes
   a. iteratively stepping row and column windows that include the respective sets of boundaries over the projections,
   b. at each iteration of a given window calculating a corresponding total score, and
   c. selecting the row and column window positions that correspond to the maximum row and column total scores.

13. The method of claim 9 wherein the step of calculating the total score includes
   for the row boundaries calculating individual row scores as ratios of the average projection value within the corresponding row boundary and the average projection values within associated row gaps, and
   for the column boundaries calculating individual column scores as ratios of the average projection value within the corresponding column boundary and the average projection values within associated column gaps, and
   accumulating the individual row scores associated with the rows of the grid to produce an associated sub-total row score and subtracting weighted scores associated with the peripheral rows to produce the associated total row score, accumulating the individual column scores associated with the columns of the grid to produce an associated subtotal column score and subtracting weighted scores associated with the peripheral columns to produce the associated total column score.

14. The method of claim 13 wherein the steps of fitting the row and column boundaries includes
   a. changing the spacing between the respective boundaries,
   b. for each change calculating a corresponding total score, and
   c. selecting the row or column spacing that corresponds to the maximum total score to determine sizes for row or column gaps.

15. The method of claim 13 wherein the steps of fitting the row and column boundaries includes
   a. changing the separations of the respective boundaries,
   b. for each change calculating a corresponding row or column total score, and
   c. selecting the row and column boundary separations that correspond to the maximum row and column total scores to determine spot sizes.

16. The method of claim 1 wherein the steps of fitting the row and column boundaries includes
   a. iteratively stepping row and column windows that include the respective sets of boundaries over the projections,
   b. at each iteration of a given window calculating a corresponding total score, and
   c. selecting the row and column window positions that correspond to the maximum row and column total scores.

17. The method of claim 16 wherein the step of calculating the total score includes
   for the row boundaries calculating individual row scores as ratios of the average projection value within the corresponding row boundary and the average projection values within associated row gaps, and
   for the column boundaries calculating individual column scores as ratios of the average projection value within the corresponding column boundary and the average projection values within associated column gaps, and
   separately accumulating the individual row scores and the individual column scores.

18. The method of claim 1 wherein the steps of fitting the row and column boundaries includes
   a. changing the spacing between the respective boundaries,
   b. for each change calculating a corresponding total score, and
   c. selecting the row or column spacing that corresponds to the maximum total score to determine sizes for row or column gaps.

19. The method of claim 1 wherein the steps of fitting the row and column boundaries includes
   a. changing the separations of the respective boundaries,
   b. for each change calculating a corresponding row or column total score, and
   c. selecting the row and column boundary separations that correspond to the maximum row and column total scores to determine spot sizes.

20. The method of claim 1 further including the steps of iteratively rotating the boundaries and determining total row and column scores that correspond to the respective orientations, and selecting the orientation that corresponds to the maximum total scores.

21. The method of claim 1 wherein, in the step of calculating the image projections, accumulating includes one of taking a sum of pixel intensities and taking an average of pixel intensities.

22. A system for determining spot locations on a microarray image, the system including
   a display for displaying an electronic image of a microarray;
   a processor for
   calculating horizontal and vertical image projections as accumulations of pixel contributions in horizontal and vertical directions;
   fitting one of a set of row boundaries and a set of column boundaries to the horizontal or vertical image projections to maximize a total score that is based on the accumulations and corresponds to the areas of the projections within the boundaries;
   fitting the other of the set of row or column boundaries to the horizontal or vertical image projections to maximize a total score that is based on the accumulations and corresponds to the areas of the projections within the boundaries;
   defining row and column stripe locations that correspond to the locations of the respective sets of row and column boundaries and associated gaps; and
   determining spot locations as the intersections of the row and column stripes.

23. The system of claim 22 wherein the display further displays a nominal grid of spot locations superimposed on the microarray image as initial conditions for one or both of the relative spacings on the rows and column boundaries and the separations of the respective boundaries.

24. A computer-readable storage medium having stored thereon a program for executing a method of determining spot locations on a microarray image comprising the steps of
   displaying the microarray image on a display device;
   calculating horizontal and vertical image projections as accumulations of pixel contributions in horizontal and vertical directions;
   fitting one of a set of row boundaries and a set of column boundaries to the horizontal or vertical image projections to maximize a total score that is based on the accumulations and corresponds to the areas of the projections within the boundaries;
   fitting the other of the set of row or column boundaries to the horizontal or vertical image projections to maximize a total score that is based on the accumulations and corresponds to the areas of the projections within the boundaries;
   defining row and column stripe locations that correspond to the locations of the respective sets of row and column boundaries and associated gaps; and
   determining spot locations as the intersections of the row and column stripes.

25. The computer-readable storage medium of claim 24 further including displaying a nominal grid of spot locations superimposed on the microarray image as initial conditions for one or both of the relative spacings on the rows and column boundaries and the separations of the respective boundaries.

* * * * *